Dec. 8, 1925. 1,564,940
F. S. CHAPMAN
METHOD OF DETECTING THE PRESENCE AND APPROXIMATE LOCATION OF METALLIC MASSES
Filed Nov. 12, 1919
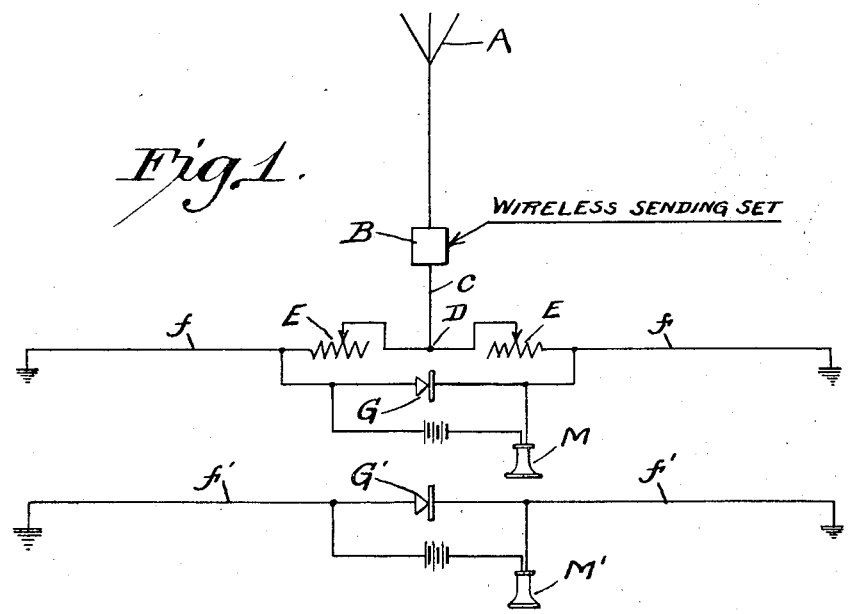
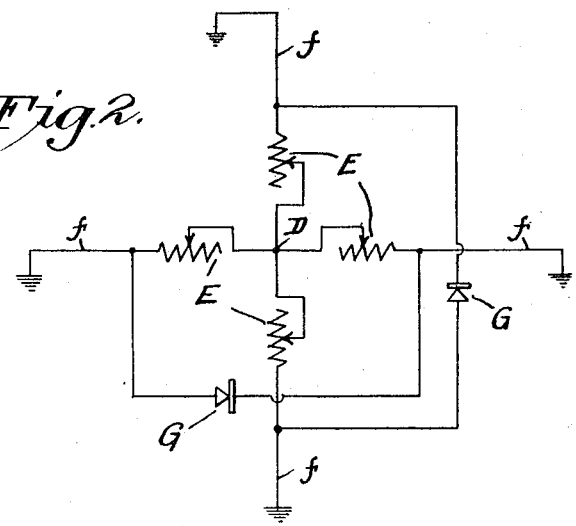
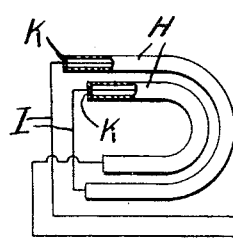
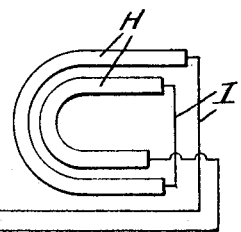
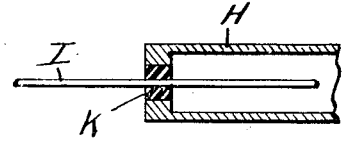
Frank Spencer Chapman *Inventor:*

Patented Dec. 8, 1925.

1,564,940

UNITED STATES PATENT OFFICE.

FRANK SPENCER CHAPMAN, OF GREENSBURG, INDIANA.

METHOD OF DETECTING THE PRESENCE AND APPROXIMATE LOCATION OF METALLIC MASSES.

Application filed November 12, 1919. Serial No. 337,481.

*To all whom it may concern:*

Be it known that I, FRANK SPENCER CHAPMAN, a citizen of the United States, residing at Greensburg, in the county of Decatur and State of Indiana, have invented a new and useful Improvement in Methods of Detecting the Presence and Approximate Location of Metallic Masses, of which the following is a specification.

My invention relates to wireless electric communication systems generally, and the object of my invention is—

First, to provide an improved means for receiving wireless impulses from beneath the ground or water-body surfaces;

Second, to provide an improved means whereby wireless electric impulses may be received at the same time wireless electric impulses are being sent; and Third, to provide an improved means whereby the direction of travel of wireless electric impulses may be determined, thus providing means which may be used in the art for other purposes.

Fourth, to provide an improved method of detecting the presence and approximate location of metallic masses.

I attain these objects by the apparatus shown in the accompanying drawings in which—

Fig. 1 shows a portion of a sending-receiving wireless station having a ground-wireless antenna and an aerial antenna; Fig. 2 is merely another view of that portion of Fig. 1 comprising the antennæ $ff$, the function of Fig. 2 being to indicate that the antenna $ff$ of Fig. 1 comprises two parts at right angles; Fig. 3 shows two large loop antennæ for receiving purposes, part of the wire thereof being shielded with iron or other suitable metal tubes. This loop system is in a balanced position with regard to L, a wireless-wave-source representing the central part of the field surrounding A, Fig. 1; Fig. 4 is an enlarged detail of part of H, Fig. 3.

Fig. 1 is a drawing showing the aerial antenna A, the wireless electric sending set B, a ground wire C leading from B, at D, C is divided as shown. EE are variable resistances. $ff$ are two branches of C. $ff$ comprise what I term the "ground antennæ" and are to be connected to earth or, if used on the sea, are to be "grounded" by being attached to a suitable electrode submerged in the water. G is a detector and M the receiver associated therewith. G should be placed in the central or balanced position so that when current is flowing to ground from $ff$ no current will flow through G. This may be done by well known methods. Under such conditions, impulses may be sent from the system and will not be heard in receiver M. Wireless electric impulses, coming from beneath the ground and traveling parallel with $ff$ will cause a current to flow in $ff$, the resistance EE forcing the said current to flow through G and thus operate M.

But if the wireless impulses travel in a direction parallel with the sea surface and at right angles with $ff$ no current will flow in $ff$. And by having the "ground" antenna movable this arrangement will provide means whereby the line of direction of the wireless impulses may be determined.

$f'f'$ is a second "ground" antenna only. It is used for receiving purposes only and in that respect it will function same as FF. Placed closely parallel with FF it will be easier to balance against outgoing impulses from this station, as it will not act as a conductor of outgoing current.

Fig. 2 shows two "ground" antennæ arranged at right angles to and crossing each other at the common central point, as shown, and joined at D to which is connected the wireless sending set B and aerial antenna A as in Fig. 1. With this, two messages may be received at the same time, if the direction from which they are coming be at right angles, or approximately so, with each other. Or the whole apparatus may be moved on the position of D as a pivot until, for a given set of impulses being received, no noise is heard in one receiver and the heaviest noise in the other. Thus the line of direction of the impulses under observation may be determined.

Fig. 3 shows two "looped" antennæ located some distance apart with a pair of wires connecting them through the line-reversing switch J. II are exposed wires forming part of the "loop", the continuation of which wires enter HH, which are iron tubes enclosing the continuation of II and insulated from the latter at all points. The purpose of HH is to intercept the radio waves so that they will not cut through the tube-enclosed parts of II, so that no current will be induced in such enclosed part of II. Were all of the wire of the loop exposed, the wireless waves would induce current in both sides of the loop, of approximately equal strength, but the current from one side of the loop would be in a direction to oppose that from the other, and both would be somewhat neutralized, and hence would be somewhat inoperative as regards the receiver. But by enclosing part of II in the tubes as shown, a louder noise will be heard in the receiver and thus messages may be better received. By adding large numbers of turns to the loop, this may be greatly increased. This action of the system as shown depends, however, on the position of J. If it be closed in one position, the output from one of the "looped" antenna will coincide in direction with that from the other, and the effect be to "boost" the voltage and thus increase the receiving efficiency. But if J be thrown to the other closed position, the two looped antenna will "buck" each other, and if both are at an equal distance from the wireless source, silence in the receiver will result.

Therefore, if "L" be a wireless wave source, separated from and at an approximately equal distance from both of the "looped" antenna, it may be worked and not heard in the receiver, if J be in the "bucking" position. But another set of wireless impulses, their source being further from one of the looped antenna than the other and not in a direction parallel to II may be heard in the receiver and not interfered with by "L".

Impulses coming from "L" may cause induced impulses to be emitted from a nearby metal mass and these induced impulses, cutting through the looped antennæ may cause a noise in the receiver, and thus indicate the presence of an otherwise hidden metal mass. In this case, all the apparatus shown in Fig. 3 should be mounted on the same movable base, so that in action "L" will always be at an equal distance from both "looped" antenna. By proper maneuvering, the metal mass may be located. And substantially this same action and result may be had with Fig. 1.

The apparatus shown herein is also described, and claimed in my application for patent dated as filed May 7, 1921, Serial No. 467,782, "Wireless communication system", the method of operating only being claimed herein.

Fig. 4 shows an enlarged detail of H with its insulating part K separating I from H.

The method of operation is as follows: The system is first balanced in a location where it cannot be affected by the presence of any metal, care being taken to see that no such mass exists within its range, except that of the ship or mounting on which it is located, (the balancing takes care of such mounting). Then, assuming that the metal mass which it is desired to locate is beneath the sea surface, the apparatus being mounted on a ship, the said ship is moved continuously in any direction, the sending set B being worked at short intervals. And when at the time of such working, a noise corresponding in time and duration thereto is heard in any of the receivers M, it indicates the presence of a metal mass.

This noise may be first heard in any of the antennæ, and if not in the apparatus covered by Fig. 3, there should be a change of direction of the ship until it is heard in M Fig. 3. The ship is then maneuvered in all possible directions and preferably over as small an area as possible until the noise in M, Fig. 3, ceases with comparative suddenness. The ship is then in the same manner as before placed at right angles to the just-found silent position, and if the silence in M, Fig. 3 is still maintained, the ship is over the searched-for metal mass. If not, further maneuvering of the ship must be carried on until the suddenly-arrived-at silence is maintained in M, Fig. 3 in all positions of the ship. Thus the general line of direction between the ship and the metal mass may be determined as also the approximate location thereof.

Having described my invention and made separate application for a patent on the mechanical features thereof (as a division) in my application dated as filed May 7, 1921, Serial No. 467,782, "Wireless communication systems" what I claim is:

1. The method of determining the general line of direction between a given position and a metal or other radio-reflecting mass which consists in propagating radio waves, intercepting and translating reflex radio waves, then balancing out the said reflex radio waves.

2. The method of determining the location of a metal or other radio-reflecting mass which consists in propagating radio waves, intercepting and translating reflex radio waves, determining the general line of direction between a given position and the said mass by balancing out the said reflex radio waves, then following the said line of direction.

3. The method of decreasing undesirable reception of radio waves in an antenna having a loop circuit, which consists in substantially balancing the said circuit against the said reception, and shielding the said circuit by a radio-reflecting member.

4. The herein described method consisting of moving a radio wave propagating device in a determined direction, propagating radio waves therefrom at intervals, intercepting and translating reflex radio waves until said interception and translation ceases with comparative suddenness, changing the direction of movement of the radio propagating device and again intercepting and translating reflex radio waves until said reflection ceases.

5. The herein described method consisting of electrically balancing a radio wave propagating device in a location where the presence of metal is suspected, moving said device along a determined path in respect to said suspected metal, propagating radio waves from said device at intervals, intercepting and translating radio waves reflecting from said suspected metal until said interception and translation stops, and then moving said device in all possible directions until said interception and translation again stops thereby indicating the approximate location of the metal.

FRANK SPENCER CHAPMAN.